March 24, 1970 TOSHIRO WATANABE 3,502,799

COLOR VIDEO SIGNAL GENERATING APPARATUS

Filed July 31, 1967 4 Sheets-Sheet 1

INVENTOR
TOSHIRO WATANABE
BY Lewis H. Eslinger
ATTORNEY

March 24, 1970 TOSHIRO WATANABE 3,502,799

COLOR VIDEO SIGNAL GENERATING APPARATUS

Filed July 31, 1967 4 Sheets-Sheet 2

INVENTOR
TOSHIRO WATANABE
BY Lewis H. Eslinger
ATTORNEY

COLOR VIDEO SIGNAL GENERATING APPARATUS

Filed July 31, 1967 4 Sheets-Sheet 3

INVENTOR
TOSHIRO WATANABE
BY Lewis H. Eslinger
ATTORNEY

March 24, 1970 TOSHIRO WATANABE 3,502,799

COLOR VIDEO SIGNAL GENERATING APPARATUS

Filed July 31, 1967 4 Sheets-Sheet 4

INVENTOR
TOSHIRO WATANABE
BY Lewis H. Eslinger
ATTORNEY

United States Patent Office 3,502,799
Patented Mar. 24, 1970

3,502,799
COLOR VIDEO SIGNAL GENERATING APPARATUS

Toshiro Watanabe, Zushi-shi, Japan, assignor to Sony Corporation, Tokyo, Japan, a corporation of Japan Filed July 31, 1967, Ser. No. 657,139
Claims priority, application Japan, Aug. 3, 1966, 41/50,928; Sept. 19, 1966, 41/61,843
Int. Cl. H04n 5/26, 5/30, 9/06
U.S. Cl. 178—5.4 16 Claims

ABSTRACT OF THE DISCLOSURE

In a color video signal generating apparatus in which a filter having regions respectively selecting light of different wavelength ranges and a screen having separating lenses are optically interposed between an object to be televised and a single image pickup tube to cause such separating lenses to coact with the filter in dividing an image of the object into color components projected onto the tube so that the electrical output of the tube is composed of successive signals corresponding to the intensities of the color components successively encountered in a line scanning direction, such screen has its separating lenses spaced apart with non-separating portions therebetween through which a panchromatic image of the object is projected onto the pickup tube in overlapping relation to the divided color components, and high resolution color video signals are extracted from the resulting output of the image pickup tube.

This invention relates to a color video signal generating apparatus which produces high resolution sequential color video signals corresponding to the color components of an object to be televised.

In the apparatuses disclosed in my copending United States application Ser. Nos. 645,727, 646,045 and 653,252 filed June 13, 1967, June 14,1967 and July 13, 1967, respectively, separation of color components is effected by means of a lens screened formed of a plurality of contiguous cylindrical lenses arranged sequentially, so that resolution of the color video signal in the horizontal or line scanning direction is dependent upon the number of the cylindrical lenses. With such an arrangement, enhancement of the resolution requires reduction of the width of each cylindrical lens which renders difficult the production of the lens screen and prevents fabrication of inexpensive and small-sized color television cameras.

Accordingly, it is an object of this invention to enhance the resolution of the color video signals produced by generating apparatus of the type referred to above, without requiring a great number of separating lenses in the screen for separating the color components of the object to be televised.

Another object is to provide a color television camera of high resolution which employs a single vidicon tube, and which may be relatively inexpensive and of small size.

In accordance with an aspect of this invention, the lens screen of an apparatus of the desired character has a plurality of separating lenses which are spaced apart by non-separating portions of the screen, whereby a panchromatic image and separated color component images of an object being televised are focused on the same photoconductive layer of the vidicon or pickup tube, and color video signals of high resolution are extracted from the resulting electrical output of such tube.

The above, and other objects, features and advantages of this invention, will become apparent from the following detailed description of illustrative embodiments which is to be read in conjunction with the accompanying drawings, in which.

Figure 1:
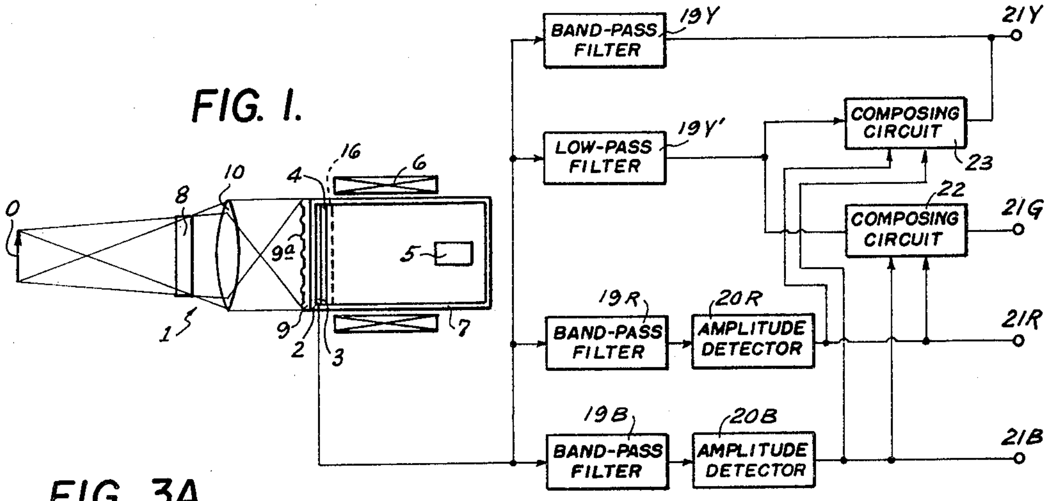
FIG. 1 is a schematic top view illustrating one embodiment of a color video signal generating apparatus in accordance with this invention.
Figure 6:
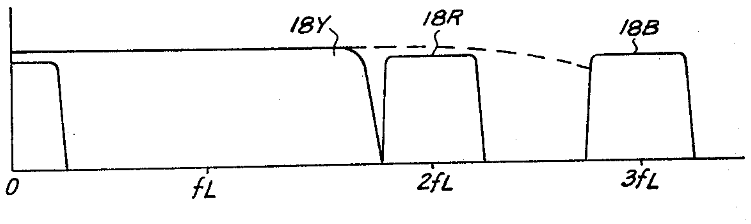
Figure 7:
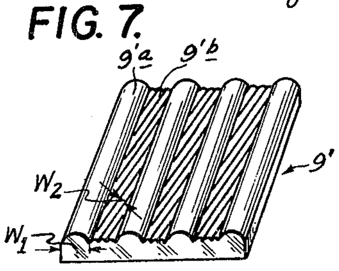
Figure 8:
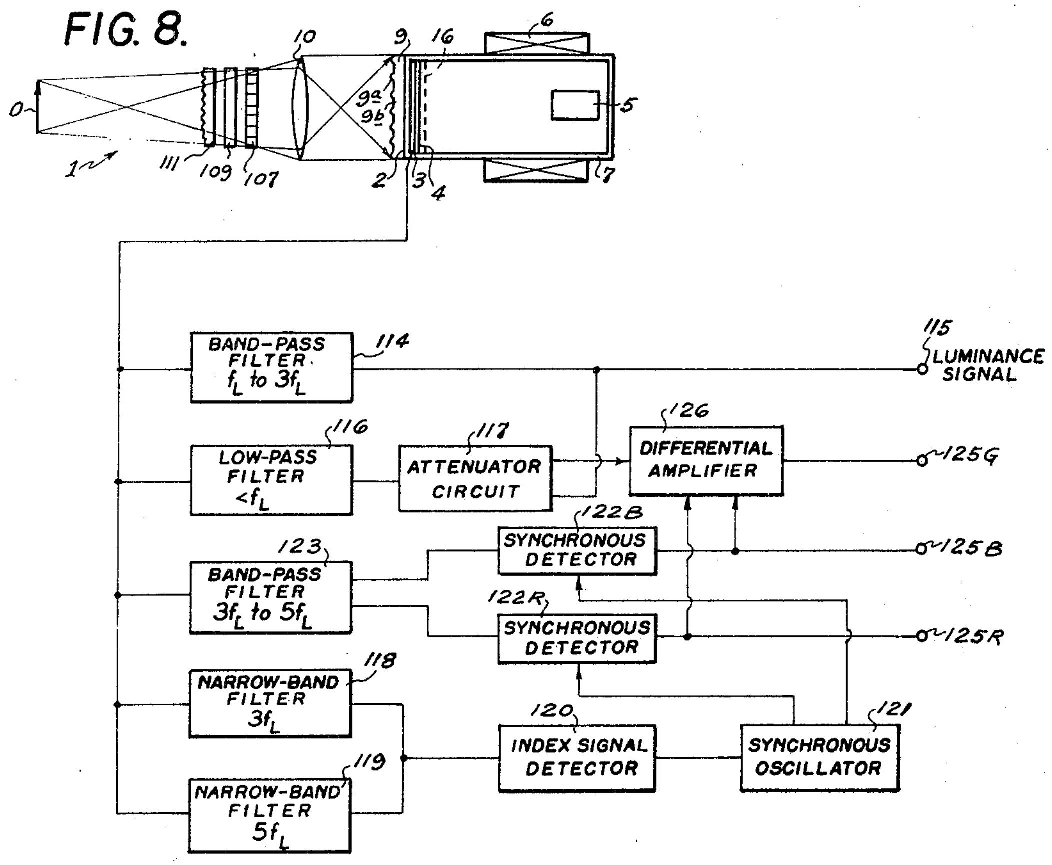
Figure 9:
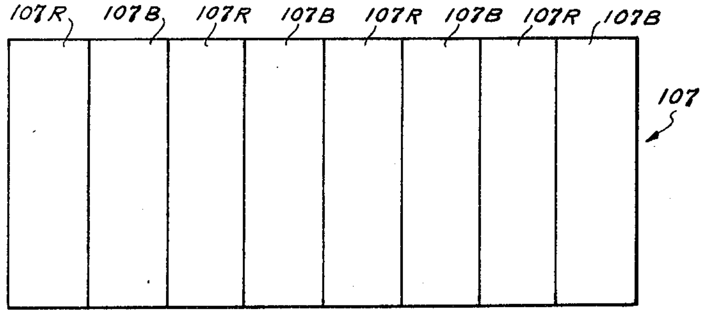
Figure 10:
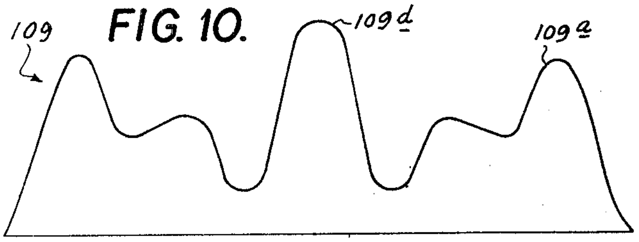
Figure 11A:
Figure 11B:
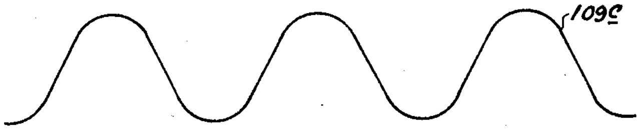
Figure 13A:
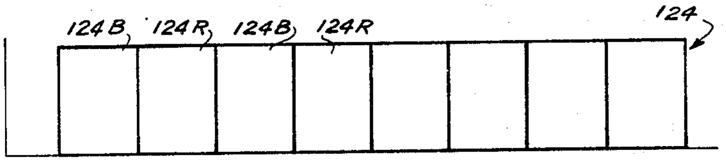
Figure 13B:
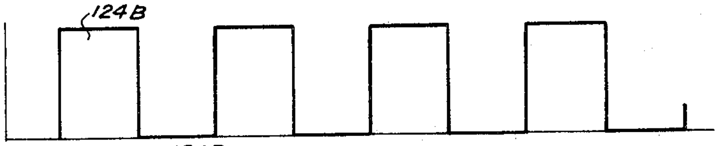
Figure 13C:
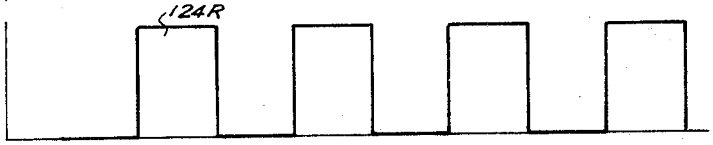
Figure 14:
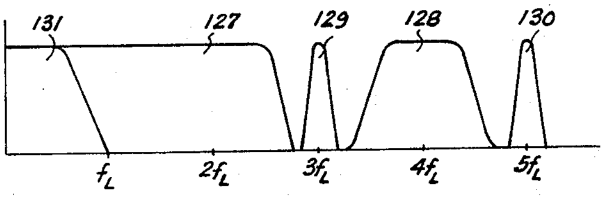
Figure 16:
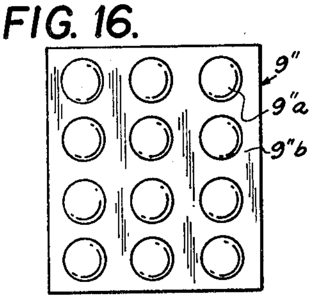
Figure 12:
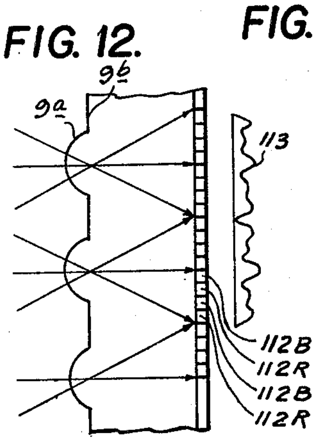
Figure 15:
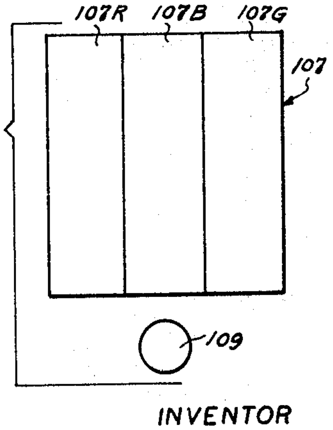
Figure 17:
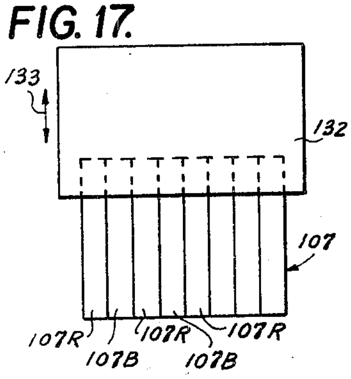

FIGS. 5A to 5F, inclusive, are schematic diagrams illustrating the distributions of the several color components on the image pickup tube of the apparatus of FIG. 1;

FIG. 6 is a diagram showing the frequency spectrums of the color video signals produced by the apparatus of this invention;

FIG. 7 is a perspective view schematically illustrating another lens screen that can be employed in an apparatus according to this invention;

FIG. 8 is a schematic top view illustrating another embodiment of this invention;

FIG. 9 is a front view schematically illustrating a color filter employed in the apparatus of FIG. 8;

FIG. 10 is a front view schematically illustrating an index signal generating means that may be employed in the apparatus of FIG. 8;

FIGS. 11A and 11B are schematic diagrams for explaining the configuration of the index signal generating means of FIG. 10;

FIG. 12 is a schematic diagram showing the manner in which separation is effected by the color filter and the lens screen in the apparatus of FIG. 8;

FIGS. 13A, 13B and 13C are diagrammatic views illustrating the component color signals produced by the apparatus of FIG. 8;

FIG. 14 is a diagram showing frequency spectrums produced by the color video signal generating apparatus of FIG. 8;

FIG. 15 is a front view schematically illustrating another form of index signal generating means that may be used in the apparatus according to this invention;

FIG. 16 is a front view schematically showing still another lens screen that can be used in the apparatus according to this invention; and FIG. 17 is a diagram schematically illustrating an iris or stop device useable in the apparatus according to this invention.

Referring to the drawings in detail, and initially to FIG. 1 thereof, it will be seen that an apparatus 1 for generating color video signals in accordance with this invention generally comprises a single image pickup tube 7, for example, in the form of a vidicon tube, a color filter 8, a camera or objective lens 10 and a lens screen 9.

The image pickup tube 7 is shown to include the usual face plate 2 having a transparent electrode 3 on its inner surface which, in turn, is covered by a photoconductive layer 4, for example, formed of PbO. A mesh electrode 16 is located within the envelope of the image pickup tube 7 adjacent the photoconductive layer 4, and an electron gun device 5 is located adjacent the end of the envelope remote from the face plate 2 to emit an electron beam which is focussed on the photoconductive layer 4 and made to scan the surface of the latter by means of a beam deflection arrangement indicated at 6. Conventional electronic components (not shown) which form no part of this invention are connected with the image pickup tube 7 in the usual manner to effect scanning of the photoconductive layer 4, and the electrical output from electrode 3 is composed of sequential signals which represent the object O to be televised. As is usual, scanning of the photoconductive layer 4 may be effected by horizontally oscillating the electron beam and successively vertically displacing the beam with its successive oscillations so that the entire useful area of the photoconductive layer 4 is cyclically covered by a series of the horizontal oscillations.

The color filter 8 is disposed at a predetermined location spaced forwardly from the face plate 2 and lies in a plane parallel to the latter.

Figure 2:
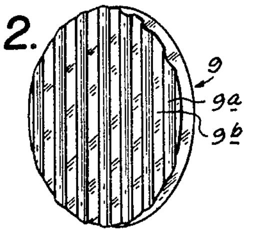
FIG. 2 is a perspective view schematically illustrating a lens screen employed in the apparatus of FIG. 1.

The lens screen 9 consists of an assembly of cylindrical lenses 9*a*, which are referred to as "lenticules" and arranged at regular intervals with their longitudinal axes extending parallel to each other, as shown on FIG. 2. The cylindrical lenses 9*a* may be conveniently formed integral with each other, as by suitably molding the lens screen as a unit, for example, from glass, acrylic resin or the like. The lens screen 9 thus formed is secured to the front surface of the face plate 2 by a suitable adhesive binder, with such lens screen being disposed so that the longitudinal axes of its cylindrical lenses 9*a* extend vertically, that is, at right angles to the horizontal scanning direction on the photoconductive layer 4. Of course, it is possible to form the lenticules or cylindrical lenses 9*a* directly on the face plate 2 of the image pickup tube 7, but such arrangement is not as practical, in terms of its manufacture, as the illustrated arrangement employing a separately formed lens screen 9 secured to the face plate.

The camera or objective lens 10 interposed between the color filter 8 and the lens screen 9 is shown schematically as a simple, single element, but, in practice, a multi-element lens is employed for achieving the desired optical performance characteristics. The camera lens 10 is provided to focus on the photoconductive layer 4 a real image I of the object O which is to be televised. In practice, the best focus position for the lens 10 may be determined by photographic tests.

In accordance with this invention, the lens screen 9 further has portions through which panchromatic images of the object O are focused on the photoconductive layer 4 so as to be overlapped by the separated color images of the object O projected on the same photoconductive layer 4 by the cylindrical lenses 9*a*. The separated color images are such that the image of the object O is separated into stripe-like image elements in particular patterns of intensities in accordance with the colors at respective positions in the object, and the separated color images are lower in resolution in the line scanning direction than the panchromatic images. However, since the acuity for color changes of the human eye is lower than that for luminance changes, the color video signal that is obtained has a high resolution.

In order to obtain such panchromatic images and separated color images, the lens screen 9 (FIG. 2) has, in addition to the cylindrical lenses 9*a*, non-lens portions, that is, flat portions 9*b* in this example, which do not substantially function as lenses and are interposed between adjacent cylindrical lenses 9*a*.

Figure 3A:
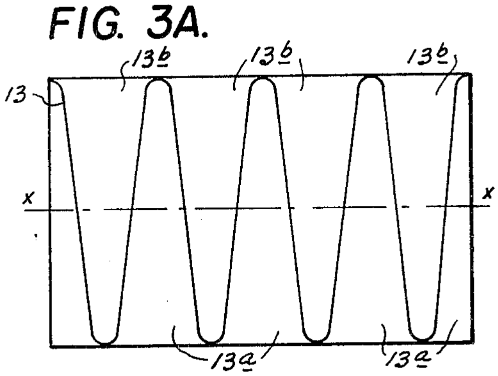
FIGS. 3A, 3B and 3C are schematic diagrams for explaining the color filter employed in the apparatus of FIG. 1.
Figure 3B:
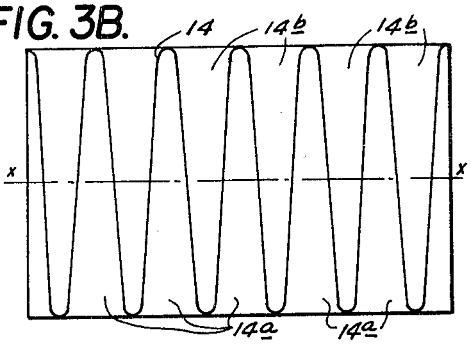
Figure 3C:
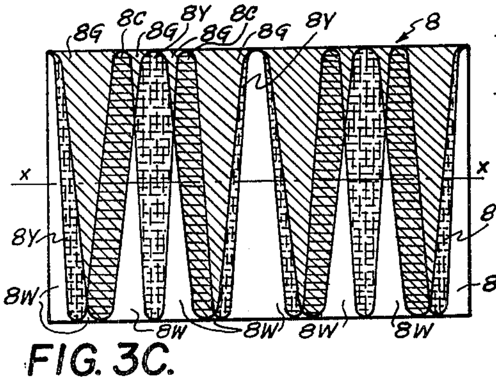

The color filter 8 is divided into two groups of areas 13*a* and 13*b* by a sinusoidal curve 13 of four cycles (FIG. 3A) and is further divided into two groups of areas 14*a* and 14*b* by a sinusoidal curve 14 of six cycles (FIG. 3B), the curves 13 and 14 being bisected by the same reference line X—X. As shown on FIG. 3C, those portions of the areas 14*a* which are not overlapped by any of the areas 13*b* are provided as transparent regions 8W which permit passage of red, green and blue colored light; those portions of the areas 14*b* which are overlapped by the areas 13*a* are provided as yellow color filter regions 8Y which permit passage of red and green colored light; those portions of the areas 13*b* which are overlapped by the areas 14*a* are provided as cyan color filter regions 8C which permit passage of blue and green colored light; and the other remaining portions, namely, the overlapped portions of the areas 13*b* and 14*b* are provided as green color filter regions 8G which permit passage of green color light.

The color filter 8 and the lens screen 9 are arranged so that the reference line X—X bisecting the curves 13 and 14 of the color filter extends at right angles to the longitudinal axes of cylindrical lens 9*a*, and the lens 10 is positioned at such a location that a real image I of the object O passing through each flat portion 9*b* of the lens screen 9 is focused on the photoconductive layer 4. Further, each cylindrical lens 9*a* is adapted to focus an image of the color filter 8 on the photoconductive layer 4.

Figure 4:
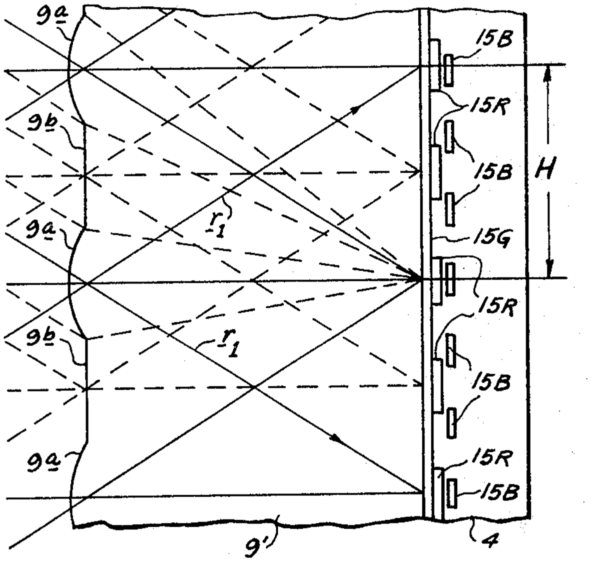
FIG. 4 is a schematic diagram showing the manner in which color separation is effected by the lens screen of FIG. 2 and the color filter of FIG. 3C.

With the arrangement described above, the image of the color filter 8 passing through each cylindrical lens 9*a* is projected on the photoconductive layer 4 at a stripe-like area thereof having a width corresponding to two times the pitch H of the lens 9*a* in the direction at right angles to the longitudinal axis of the lens 9*a* (FIG. 4). That is, incident light passing through each cylindrical lens 9*a* from the object O is separated into color components by the color filter 8 and projected onto an area of the photoconductive layer 4 corresponding to two cylindrical lenses 9*a* and two flat portions 9*b*, as indicated by the rays $r_1$ on FIG. 4. In the case of the above described color filter 8, the green color component of the incident light passes through the entire area of the color filter, and hence its color image extends completely across the area of the photoconductive layer 4 corresponding to the two cylindrical lenses and the two flat portions and is of substantially uniform intensity, as indicated at 15G on FIG. 4. The red color component passes only through the regions 8W and 8Y which encompass the areas 13*a* of the color filter 8, so that its color image appearing on the photoconductive layer 4 has four variations of intensity in the direction across the respective lens 9*a* in accordance with the curve 13, as designated at 15R on FIG. 4. The blue color component passes primarily through the regions 8W and 8C which encompass areas 14*a* and consequently its color image appearing on the photoconductive layer 4 has six variations of intensity in the direction across the respective lens 9*a* in accordance with curve 14, as indicated at 15B on FIG. 4. As is apparent from FIG. 4, the separated color images thus produced by each lens 9*a* are overlapped by color images separated by adjacent cylindrical lenses. In this example, the color images separated by adjacent lenses are overlapped, but it is also possible that the color images which are overlapped may be separated by more widely spaced lenses of screen 9.

Figure 5A:
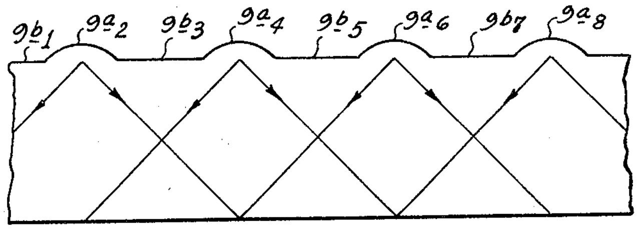
Figures 5B, 5C, 5D, 5E:
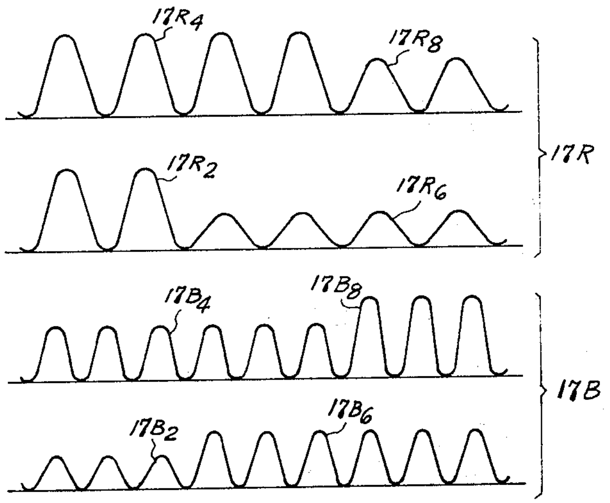
Figure 5F:
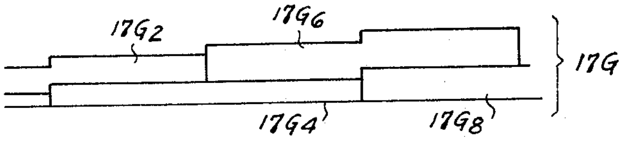

Accordingly, when the photoconductive layer 4 is scanned by an electron beam in such a manner that the line scanning direction is at right angles to the longitudinal axes of the cylindrical lenses 9*a*, there are produced the following signals which are described with reference to FIGS. 5A to 5F. When the photoconductive layer 4 is scanned at those areas corresponding to cylindrical lenses $9a_2$, $9a_4$, $9a_6$, $9a_8$ and flat portions $9b_1$, $9b_3$, $9b_5$, $9b_7$, there are produced red, blue and green color signals in the form of composite signals as indicated at 17R, 17B and 17G. The red color signal 17R consists of a sinusoidal signal $17R_4$ corresponding to the cylindrical lens $9a_4$ and varying with the curve 13 within the area between the cylindrical lenses $9a_2$ and $9a_6$ and a sinusoidal signal $17R_8$ corresponding to the cylindrical lens $9a_8$ and similarly varying with the curve 13, as depicted in FIG. 5B and a signal $17R_2$ corresponding to the cylindrical lens $9a_2$ within the area between adjacent cylindrical lenses and a signal $17R_6$ corresponding to the cylindrical lens $9a_6$, as illustrated in FIG. 5C. The blue signal 17B is composed of a sinusoidal signal $17B_4$ corresponding to the cylindrical lens $9a_4$ and varying with the curve 14 within the area between the cylindrical lenses $9a_2$ and $9a_6$ and a signal $17B_8$ corresponding to the cylindrical lens $9a_8$ as shown in FIG. 5D, and a signal $17B_2$ corresponding to the cylindrical lens $9a_2$ within the area between adjacent cylindrical lenses and a signal $17B_6$ corresponding to the cylindrical lens $9a_6$ within the area between the cylindrical lenses $9a_4$ and $9a_8$, as shown in FIG. 5E. In a similar manner, the green color signal 17G consists of a uniform signal $17G_4$ corresponding to the cylindrical lens $9a_4$ and remaining unchanged within the area between the cylindrical lenses $9a_2$ and $9a_6$, a signal $17G_8$ corresponding to the cylindrical lens $9a_8$, a signal $17G_2$ corresponding to the cylindrical lens $9a_2$ within the area between adjacent cylindrical lenses, and a signal $17G_6$ corresponding to the cylindrical lens $9a_6$ within the area between the cylindrical lenses $9a_4$ and $9a_8$, as illustrated in FIG. 5F.

Simultaneously with the projection of the above described separated color images, passing through the flat portions 9b of the lens screen 9, are projected as panchromatic images on the photoconductive layer 4 in overlapping relation to the aforementioned separated color images. It will be noted that the image elements of the real image of the object O passing through each cylindrical lens 9a are thereby defocused and are projected in overlapping relation to the separated color images.

The above described electron beam scanning of photoconductive layer 4 provides a video signal having frequency ranges in the video spectrum, as depicted in FIG. 6. Assuming that the product of the line scanning frequency and the number of cylindrical lenses 9a or flat portions 9b is $f_L$, there are produced a black-and-white signal of frequencies ranging from 0 to $1\frac{3}{4}f_L$, a luminance signal 18Y composed of DC components of the green, red and blue color signals 17G, 17R and 17B which are of a frequency less than $\frac{1}{4}f_L$, a red signal component 18R of frequencies in a band ranging from $(2f_L-\frac{1}{4}f_L)$ to $(2f_L+\frac{1}{4}f_L)$ obtained by modulating $2f_L$ with the envelope of the red signal 17R, and a blue signal component 18B of frequencies in a band ranging from $(3f_L-\frac{1}{4}f_L)$ to $(3f_L+\frac{1}{4}f_L)$ obtained by modulating $3f_L$ with the envelope of the blue signal 17B. Accordingly, as shown on FIG. 1, there are connected to electrode 3 a band-pass filter 19Y passing frequencies in the range from $\frac{1}{4}f_L$ to $1\frac{3}{4}f_L$, a low-pass filter 19Y' passing frequencies in the range from 0 to $\frac{1}{4}f_L$, a band-pass filter 19R passing frequencies in the range from $1\frac{3}{4}f_L$ to $2\frac{1}{4}f_L$ and a band-pass filter 19B passing frequencies in the range from $2\frac{3}{4}f_L$ to $3\frac{1}{4}f_L$. The filtered outputs from the filters 19R and 19B are amplitude-detected by detectors 20R and 20B, respectively, to obtain red and blue color video signals at output terminals 21R and 21B thereof. Further, the output DC components of the detectors 20R and 20B are applied to a composing circuit 22 connected to the output side of the low-pass filter 19Y' to eliminate the DC components of the detected outputs of the detectors 20R and 20B from the filtered output of the low-pass filter 19Y', thus producing a green color video signal at an output terminal 21G of composing circuit 22. Another composing circuit 23 obtains the sum of the DC components of the aforementioned outputs of detectors 20R and 20B and the filtered output of low-pass filter 19Y', and such sum is then mixed with the output of the band-pass filter 19Y, producing a luminance signal at an output terminal 12Y.

It will be apparent from the foregoing that the present invention enables the production of color video signals by the employment of a single image pickup tube. The resolution of the panchromatic image produced on the photoconductive layer 4 depends upon the lower limit of the chrominance signal component 18R. This ensures the production of a panchromatic image of relatively excellent resolution with increased line scanning speed and a reduced number of cyindrical lenses 9a in the screen 9, which resolution is at least higher than that obtainable with a system in which the cylindrical lenses of the lens screen are contiguous to each other, as in my earlier filed co-pending application Ser. No. 645,727. Although the resolution of each color component of the video signal is reduced to a quarter of that with the system mentioned above, the color picture, as a whole, is better than that obtainable with that earlier disclosed system.

Where $f_L$ is 1.4 mc. and the luminance signal 18Y is of 0 to 2.45 mc., the red, blue and green color signals range from 0 to 350 kc. Therefore, the band necessary for the image pickup tube 7 and the circuit associated therewith need not be greater than 4.55 mc. In addition, if the line scanning period in 50 microseconds, the number of cylindrical lenses 9a required to obtain an $f_L$ of 1.4 mc. is only 70, so that when the diameter of the face plate 2 of the image pickup tube 7 is 14 mm. the pitch H of each cylindrical lens 9a and flat portion 9b is 0.2 mm. In this case, if the aperture ratio F of the lens 10 is 3 and the refractive index of each cylindrical lens 9a is 1.5, the distance between the lens screen 9 and the photoconductive layer 4 is 1.8 mm. Thus, if desired, the distance from the lens screen 9 to the layer 4 can be relatively large.

In order that the higher band of the luminance signal may be removed therefrom so as not to be mixed with the chrominance signal 18R, it is possible to employ a lens screen 9' as shown in FIG. 7. The lens screen 9' is shown to consist of spaced apart cylindrical lenses 9'a and in the portions 9'b therebetween, cylindrical lenses having a width $W_2$ very much smaller than the width $W_1$ of cylindrical lens 9'a and formed obliquely on each portion 9'b. The lenses in portions 9'b defocus the panchromatic images on the photoconductive layer 4 to obscure the detail of the image, thus removing the higher band of the luminance signal.

While the panchromatic images of the object are focused on the photoconductive layer 4 in the foregoing example, it is also possible to locate the real image focusing plane forwardly of the photoconductive layer 4 and to interpose relay means, such as optical fibres, between that focusing plane and the photoconductive layer 4. Further, in the above described embodiment, common optical systems are provided for producing the separated color images and the panchromatic images, but it is also possible to form such optical systems separately of each other. In addition, the color filter 8 may include filter regions of colors other than the three primary colors, and the cycles of the curves 13 and 14 which define the various regions of the filter may be other than as disclosed. The color filter may be composed of a number of filter elements arranged side-by-side and each having a pattern similar to that on FIG. 3C but with the dimensions of the curves 13 and 14 in each pattern being reduced in the direction perpendicular to reference line X—X. Further, the color filter may be in the form of a dichroic mirror having its several regions presenting different reflection characteristics to different wavelengths, rather than transmitting the different wavelengths as in the described filter.

Referring now to FIG. 8, another example of this invention will be described with reference thereto, with the same reference numerals being employed to identify those elements in FIG. 8 which are similar to elements shown on FIG. 1.

In the embodiment of this invention shown on FIG. 8, a color filter 107 composed of color filter elements of different color selection characteristics which are sequentially arranged in a predetermined order, and a lens screen 9 consisting of a plurality of lens elements 9a spaced a predetermined distance from adjacent ones, are disposed between the object O and the photoconductive layer 4 of the vidicon tube 7. Further, index signal generating means 109 consisting of a light source is disposed between the object O and the lens screen 9 at a predetermined location relative to the arrangement of the color filter elements making up the color filter 107.

In FIG. 9, the color filter 107 is shown to be composed of four pairs of filter elements 107R and 107B sequentially arranged in alternating relation, each filter element 107R essentially permitting passage of red color light therethrough and each filter element 107B essentially permitting passage of blue color light therethrough. The color filter 107 is arranged so that the lengthwise directions of the color filter elements are parallel to the longitudinal axes of lens elements 9*a*.

The index signal generating means 108 may be plate-like and formed of an electroluminescent material so as to have a configuration, as shown on FIG. 10, in which one side edge is curved, as indicated at 109*a*. In this case, the curve of edge 109*a* is composed of the sum of sinusoidal waves 109*b* and 109*c*, as depicted in FIGS. 11A and 11B. Consequently, the curved edge 109*a* of the index signal generating means 109 is highest at the center of the color filter, considered in the direction of the width thereof, as indicated at 109*d*, so that the portion of the index signal generating means identified at 109*d* corresponds to the brightest portion of an image.

The position of the lens 10 and the focuses of the cylindrical lenses 9*a* are selected so that a real image of the object O is formed on the photoconductive layer 4 and an image of the color filter 107 passing through each lens element of the lens screen 9 is focused on the photoconductive layer 4 in overlying relation to the real image of the object O. A diffusion filter 111 is disposed near the index signal generating means 109, and defocuses the detail of the object O to remove the higher frequency portion from a luminance signal component. In FIG. 8, the index signal generating means 109 is placed forwardly of the color filter 107, but it is also possible to position them side-by-side, that is, with the index signal generating means 109 disposed at one side of the color filter 107 considered in the direction in which the color filter elements 107R and 107B extend. Further, the distance between the color filter 107 and the photoconductive layer 4 or the aperture ratio or focal length of lens 10 is selected so that an image of the color filter 107 is produced at each area of the photoconductive layer 4 corresponding to each cylindrical lens 9*a* with the width of such image being equal to the pitch of the cylindrical lenses 9*a* and, consequently, to the sum of the widths of each cylindrical lens 9*a* and in adjacent flat portion 9*b*.

With such an arrangement, a panchromatic image of the object O passing through the color filter 107, namely corresponding to an image of a composite color composed of the colors passing through the color filter 107, is formed on the photoconductive layer 4, and the object O is separated into stripe-like image elements, which are, in turn, separated into color images in the direction of the separation in accordance with the color filter 107. An index image based on the index signal generating means 109 is superposed on the separated color images. As illustrated in FIG. 12, the image 112 of the color filter 107 projected on layer 4 by each lens 9*a* is composed of images 112B and 112R of the blue and red color filter elements separated into stripes and being sequentially arranged. Since the real image of the object O is formed on the photoconductive layer 4 as above described, that portion of the object O corresponding to each cylindrical lens 9*a* of the lens screen 9 is separated into color images by the cylindrical lens 9*a* and the color filter 107. In a similar manner, images 113 of the index signal generating means 109 are formed on the photoconductive layer 4 at the areas thereof corresponding to the cylindrical lens 9*a*. Thus, the images 113 of the index signal generating means 109 are successively formed so as to correspond to the images 112 of the color filter.

The apparatus described above with reference to FIG. 8 produces video signals as follows:

The photoconductive layer 4 is scanned by an electron beam emitted from the electron gun device 5 so that the line scanning direction crosses the stripes 112R and 112B of the separated color images. A portion of the signal produced at the electrode 3 by the scanning is applied to a luminance signal terminal 115 through a band-pass filter 114 passing frequencies in the range from $f_L$ to $3f_L$, in which $f_L$ is the product of the number of the cylindrical lenses 9*a* and the line scanning frequency. Another portion of the signal from the electrode 3 is applied to terminal 115 through a low-pass filter 116 having an upper limit of frequency $f_L$ and through an attenuator circuit 117, thereby producing a luminance signal at terminal 115 which is composed of the signal passing filter 114 and the signal passing filter 116 and which is attenuated. Further, another portion of the output of electrode 3 is fed to a narrow-band filter 118 having a pass band of $3f_L$ and to a narrow-band filter 119 having a pass band of $5f_L$, and the outputs of filters 118 and 119 are applied to an index signal detector 120 to detect a peak value of a composite signal of the filters 118 and 119, by which a pulse signal corresponding to the highest portion 109*d* appearing at the center of the pattern of the index signal generating means 109 is produced to thereby control a synchronous oscillator 121. This synchronous oscillator 121 produces signals phased 180° apart from each other and having a frequency which is four times higher than $f_L$, and such signals from oscillator 121 are applied to synchronous detectors 122R and 122B, respectively. These synchronous detectors 122R and 122B also have applied thereto a portion of the video signal from the electrode 3 through a band-pass filter 123 passing frequencies in a band ranging from $3f_L$ to $5f_L$. This produces a red color video signal component and a blue color video signal component from synchronous detectors 122R and 122B, respectively. That is, when the separated color images are scanned by the electron beam, there are obtained dot-sequential signals composed of alternating blue and red color signals 124B and 124R, as depicted on FIG. 13A. Of these dot-sequential signals, only the blue color signals 124B (FIG. 13B) are fed to synchronous detector 122B and are taken out at its output terminal 125B. In a similar manner only the red color signals 124R (FIG. 13C) are fed to detector 122R and taken out at its output terminal 125R.

In addition, the output of attenuator circuit 117 is applied to a differential amplifier 126, to which there also are applied portions of the outputs of synchronous detectors 122B and 122R, by which only green color signals are obtained from the differential amplifier 126 at its output terminal 125G. Thus, color signals corresponding to the three primary colors are produced at terminals 125G, 125B and 125R.

In the apparatus of FIG. 8, the real image of the object O is focused on the photoconductive layer 4 through the flat portions 9*b* of the lens screen 9 in the form of panchromatic images composed of the color components of the color filter. Therefore, resolution becomes increased and a luminance signal having a high fequency component can be obtained. As shown on FIG. 14, the frequency spectrum of the video signal from the electrode 3 consists of a luminance signal component 127 of a frequency less than $3f_L$, a color component 128 resulting from modulating a carrier of $4f_L$ by the color signal and components 129 and 130 having frequencies of $3f_L$ and $5f_L$ and corresponding to the index generating signals. Further, a signal 131 of frequencies of 0 to $f_L$ corresponding to the DC component of the color signal component 128 is overlapped by the luminance signal 127. The upper limit of the luminance signal component 127 is controlled by the diffusion filter 111.

As has been described in the foregoing, the color video signal generating apparatus of this invention ensures the production of a luminance video signal of high resolution and a color signal of lower resolution by the use of one image pickup tube. Thus, although the color signal component is in the band from 0 to $f_L$, the luminance signal component can be increased to a sufficiently high frequency, so that the resulting picture is bright and clear. If the luminance signal and the color signal are of the same band-width, the picture quality is improved as compared with that obtainable when the luminance and color signals are in the same band. In this case, the color signal can be separated from the luminance signal by the index signal. When the bands $3f_L$ and $5f_L$ between the luminance signal component and the color signal component of the video signal are used for the index signal, as above described, the index signal can be accurately separated without interference from the luminance signal component and the color signal component.

In the foregoing the index signal generating means 109 is described as being formed of electroluminescene having the pattern shown in FIG. 10, but it need not be restricted specifically thereto. The index signal can be incorporated into the video signal by means of a point source of light 109' of a line source of light placed at a position corresponding to that one of the stripes of the color filter, as shown on FIG. 15, or at a position corresponding to the portion 109*d* of the index signal generating means 109 shown on FIG. 10. Further, the lens screen consisting of an assembly of parallel, spaced apart cylindrical lenses 9*a* may be replaced by a screen 9'' having a plurality of spherical lenses 9''*a* which are spaced apart at substantially regular intervals in spaced rows at right angles to the line scanning direction, as indicated at 9''*b* on FIG. 16. The color filter 107 (FIG. 15) can be designed to include a green color filter element 107G in addition to the red and blue color filter elements 107R and 107B, so that a dot-sequential signal of red, blue and green color signals is obtained from the video signal and is separated.

FIG. 17 illustrates an iris or stop device that may be included in the apparatus of FIG. 8 and that consists of an opaque plate 132 movable in the direction of the arrows 133. In conventional types of television cameras an iris diaphragm is provided near the lens to reduce the quantity of light passing through the lens, but the camera of this invention is provided with the color filter and hence cannot use such a conventional iris device. Therefore, in apparatus according to this invention the plate-like diaphragm 132 is provided near the color filter 107, as shown on FIG. 17, and is adapted to move in the longitudinal direction of the cylindrical lenses 9*a*. Of course, two diaphragms may be provided at upper and lower positions relative to the color filter 107, and be adapted to move in opposite directions parallel to the axes of lenses 9*a*. With such an arrangement, the quantities of light passing through the color filter elements can be changed without affecting the ratio of those quantities to one another, so that the balance of the color signals does not vary with the operation of the diaphragm.

While the index signal has been described above as having a frequency of $3f_L$ or $5f_L$, the index signal can have a frequency of $f_L$, $2f_L$, $4f_L$ and so on and can be separated by a comb filter. The flat portions 9*b* of the lens screen can be formed of lenses of small refractive index to defocus the detail of the object O, thereby eliminating the higher band component of the luminance signal. Further, in the apparatus of FIG. 8, the real image of the object O is focused on the photoconductive layer 4, but the same purpose can be attained by positioning the real image focusing plane forwardly of the photoconductive layer 4 and interposing optical relay means, such as optical fibres, between the focusing plane and the photoconductive layer 4.

Although illustrative embodiments of this invention have been described in detail above with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A color video signal generating apparatus comprising image pickup means having scanning means and being operative to photoelectrically convert light projected onto said image pickup means into an electrical output composed of successive signals coresponding to the intensities of light successively encountered by said scanning means in a line scanning direction, filter means interposed optically between an object to be televised and said image pickup means, said filter means having several regions respectively selecting light of different wavelength ranges, a screen interposed between said filter means and said image pickup means, said screen having spaced separating lenses coacting with said filter means to divide an image of the object into respective color components projected onto said image pickup means and non-separating portions disposed between said separating lenses and through which a panchromatic image of the object is projected on said image pickup means in overlapping relation to said color components, and means for extracting high resolution color video signals from the output of said image pickup means.

2. A color video signal generating apparatus according to claim 1, wherein the divided color components projected on said image pickup means by one of said separating lenses are overlapped in a predetermined relation by at least a portion of the color components divided by adjacent separating lenses.

3. A color video signal generating apparatus according to claim 1, wherein said filter means has regions providing different numbers of variations of amplitude of the respective color components considered in said line scanning direction, and the respective color components are separated from the output of said image pickup means in accordance with the respective numbers of variation of amplitude.

4. A color video signal generating apparatus according to claim 3, wherein said means for extracting color video signals from the output of said image pickup means includes band-pass filters receiving said output and respectively passing different frequency ranges to separate said output into color component signals.

5. A color video signal generating apparatus according to claim 1, wherein said regions of the filter means are of equal width and disposed side-by-side considered in said line scanning direction, said filter regions selecting at least two color components and arranged so that the respective selected color components are alternated, and further comprising index means to indicate the position of a color component to be selected.

6. A color video signal generating apparatus according to claim 5, wherein said index means includes a light source disposed adjacent said filter means and of which an image is also projected onto said image pickup means, said light source providing a relatively high amplitude of illumination at a position corresponding to the location of the color component to be selected.

7. A color video signal generating apparatus according to claim 6, in which said light source is configured to provide a number of variations of amplitude of illumination in said projected image thereof considered in said line scanning direction and by which signals in said output corresponding to said light source are separated from the color component signals.

8. A color video signal generating apparatus according to claim 1, further comprising stop means disposed adjacent said color filter means and being movable to vary the quantities of light transmitted by said regions of the filter means while maintaining constant the ratio of said quantities to each other.

9. A color video signal generating apparatus according to claim 8, wherein said color filter means has said regions thereof in the form of stripes extending at right angles to said line scanning direction, and said stop means includes at least one opaque plate movable with respect to said filter means in the direction of said stripes to variably mask the latter.

10. A color video signal generating apparatus according to claim 1, wherein said separating lenses are cylindrical lenses arranged with their longitudinal axes parallel to each other and extending at right angles to said line scanning direction.

11. A color video signal generating apparatus according to claim 10, wherein said non-separating portions of the screen are constituted by cylindrical lenses of very substantially smaller width than said separating cylindrical lenses and being arranged obliquely with respect to the latter to defocus said panchromatic image of the object and thereby remove the upper band of frequencies from a luminance signal which is included in said output along with color component signals.

12. A color video signal generating apparatus according to claim 1, wherein said separating lenses are spherical lenses arranged in spaced rows which extend at right angles to said line scanning direction.

13. A color video signal generating apparatus according to claim 1, in which said non-separating portions of the screen are substantially flat.

14. A color video signal generating apparatus according to claim 1, further comprising diffusing means to defocus said panchromatic image of the object and thereby remove the upper band of frequencies from a luminance signal which is included in said output along with color component signals.

15. A color video signal generating apparatus according to claim 14, in which said diffusing means is separate from said screen.

16. A color video signal generating apparatus according to claim 14, in which said diffusing means is incorporated in said non-separating portions of the screen.

References Cited

UNITED STATES PATENTS

| | | | |
|---|---|---|---|
| 2,479,820 | 8/1949 | De Vore | 178—5.2 |
| 2,696,520 | 12/1954 | Bradley. | |

ROBERT L. GRIFFIN, Primary Examiner

ALFRED H. EDDLEMAN, Assistant Examiner